United States Patent
Sato

(10) Patent No.: US 8,863,036 B2
(45) Date of Patent: Oct. 14, 2014

(54) INFORMATION PROCESSING APPARATUS, DISPLAY CONTROL METHOD, AND STORAGE MEDIUM

(75) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 13/481,632

(22) Filed: May 25, 2012

(65) Prior Publication Data

US 2012/0307296 A1    Dec. 6, 2012

(30) Foreign Application Priority Data

Jun. 2, 2011 (JP) ................................ 2011-124591

(51) Int. Cl.
| | |
|---|---|
| G06F 3/048 | (2013.01) |
| G06F 3/00 | (2006.01) |
| G06F 3/12 | (2006.01) |
| G06F 3/0482 | (2013.01) |
| H04N 1/00 | (2006.01) |

(52) U.S. Cl.
CPC ............ G06F 3/1205 (2013.01); *G06F 3/0482* (2013.01); *H04N 1/00204* (2013.01); *H04N 1/00429* (2013.01); *H04N 1/00432* (2013.01); *H04N 1/00482* (2013.01); *H04N 2201/0094* (2013.01); G06F 3/1253 (2013.01); G06F 3/1285 (2013.01)
USPC ............ 715/854; 715/810; 715/825; 715/774

(58) Field of Classification Search
CPC .................................................. G06F 3/0482
USPC .................................. 715/854, 810, 825, 774
See application file for complete search history.

(56) References Cited

U.S. PATENT DOCUMENTS

| | | | | |
|---|---|---|---|---|
| 6,115,044 | A * | 9/2000 | Alimpich et al. | 715/855 |
| 7,010,755 | B2 * | 3/2006 | Anderson et al. | 715/778 |
| 7,051,291 | B2 * | 5/2006 | Sciammarella et al. | 715/838 |
| 7,409,644 | B2 * | 8/2008 | Moore et al. | 715/774 |
| 8,117,226 | B2 * | 2/2012 | Samji et al. | 707/769 |
| 8,195,646 | B2 * | 6/2012 | Evans et al. | 707/716 |
| 8,516,038 | B2 * | 8/2013 | Jalon et al. | 709/203 |
| 8,543,943 | B2 * | 9/2013 | Rapp | 715/853 |
| 2004/0230599 | A1 * | 11/2004 | Moore et al. | 707/102 |
| 2007/0168885 | A1 * | 7/2007 | Muller et al. | 715/853 |
| 2007/0186183 | A1 * | 8/2007 | Hudson, Jr. | 715/810 |
| 2013/0290902 | A1 * | 10/2013 | Martin et al. | 715/823 |
| 2014/0022598 | A1 * | 1/2014 | Neeleman | 358/1.15 |

FOREIGN PATENT DOCUMENTS

JP         2549268 B2    10/1996

* cited by examiner

*Primary Examiner* — David Phantana Angkool

(74) *Attorney, Agent, or Firm* — Canon U.S.A., Inc. IP Division

(57) ABSTRACT

The present invention is directed to preventing a user from losing sight of a parameter that the user is currently set. To solve the problem, there is provided an information processing apparatus or a display control method for, when detecting that a node in a structure display area is selected by a user's operation, specifying a tab of setting associated with the selected node via a management unit and displaying the tab in a detailed setting display area, and when detecting that a tab in the detailed setting display area is selected by a user's operation, specifying a node associated with the selected tab, via a management unit and displaying the node in a selected state in the structure display area.

8 Claims, 18 Drawing Sheets

FIG.5A

500 — TASK DEFINITION LIST

| TASK NAME (501) | TASK DEFINITION (502) |
|---|---|
| SEND SMB | ... |
| SEND FTP | ... |
| ... | ... |

```
<?xml version="1.0" encoding="UTF-8" ?>
```
551 — `<Send>`
552 — `<sendName>SEND SMB</sendName>`
553 — `<stepno="1" name="LOGIN">`
554 — `<item name="USER NAME">`
555 — `<textItem>`
556 — `<initValue/>`
`</textItem>`
`</item>`
`<item name="PASSWORD">`
`<textItem>`
`<initValue/>`
`</textItem>`
`</item>`
`<item name="AUTHENTICATION TYPE">`
557 — `<choiceItem>`
558 — `<initValue>1</initValue>`
559 — `<choice no="1">NTLMv2</choice>`
560 — `<choice no="2">Kerberos</choice>`
`</choiceItem>`
`</item>`
`</step>`
561 — `<step no="2" name="CHOOSE FOLDER">`
`...`
`</Send>`

FIG.8

| PROCESSING FLOW | TREE VIEW (LEVEL 0) | TREE VIEW (LEVEL 1) | TAB CONTROL | TAB PAGE |
|---|---|---|---|---|
| SEND SMB | 1 | – | 1 | – |
| Step1 | 1 | 1 | 1 | 1 |
| Step2 | 1 | 2 | 1 | 2 |
| Step3 | 1 | 3 | 1 | 3 |
| SEND FTP | 2 | – | 2 | – |
| ... | ... | ... | ... | ... |

| PROCESSING FLOW | TREE VIEW (LEVEL 0) | TREE VIEW (LEVEL 1) | TREE VIEW (LEVEL 2) | TAB CONTROL | TAB PAGE | INPUT FIELD |
|---|---|---|---|---|---|---|
| SEND SMB | 1 | – | – | – | – | – |
| Step1 | 1 | 1 | – | 1 | 1 | – |
| USER NAME | 1 | 1 | 1 | 1 | 1 | 1 |
| PASSWORD | 1 | 1 | 2 | 1 | 1 | 2 |
| INPUT TYPE | 1 | 1 | 3 | 1 | 1 | 3 |
| Step2 | 1 | – | – | 1 | 1 | – |
| ... | ... | ... | ... | ... | ... | ... |

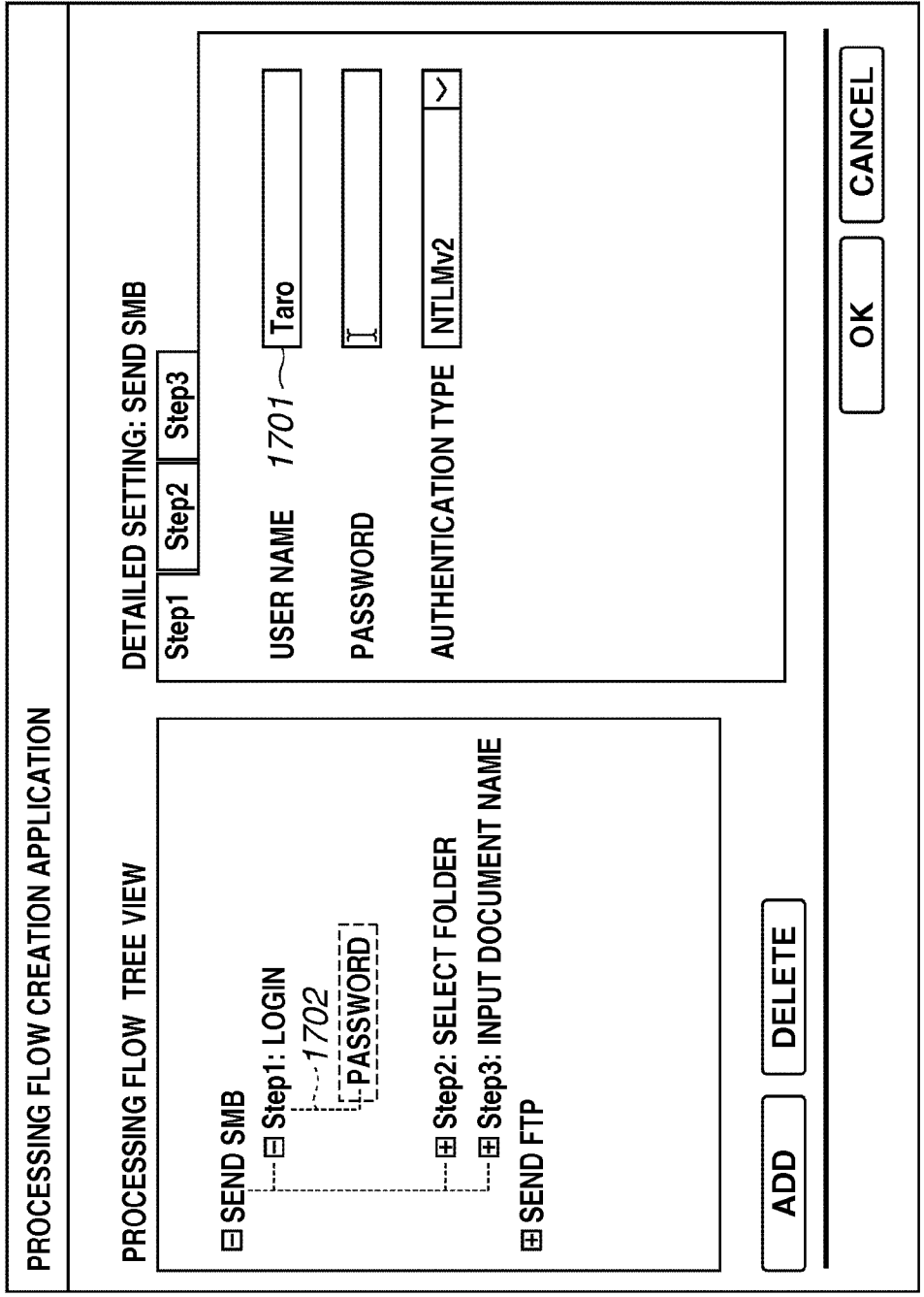

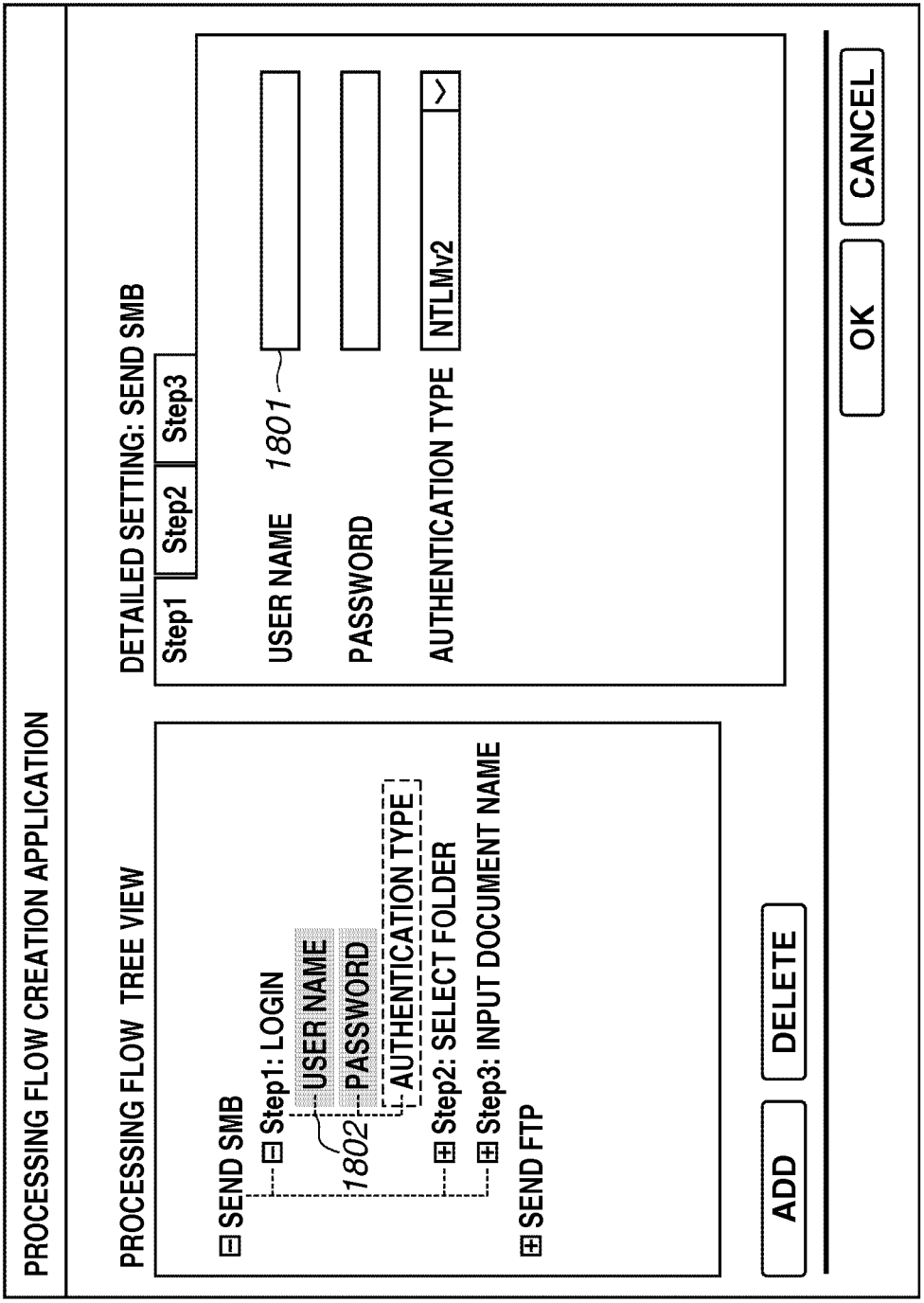

INFORMATION PROCESSING APPARATUS, DISPLAY CONTROL METHOD, AND STORAGE MEDIUM

BACKGROUND OF THE INVENTION

1. Field of the Invention

The present invention relates to an information processing apparatus, a display control method, and a program.

2. Description of the Related Art

Applications are registered as a series of processing flow by combining a plurality of tasks for documents held in an image processing apparatus such as a multifunction peripheral (MFP), and the registered series of processing flow can be executed by invoking thereof by a user. Accordingly, a combination of the processing which is frequently used can be executed without troublesome operations. In the specification of the present invention, a flow of a series of processing set up by combining a plurality of tasks is defined as a "processing flow".

The term "task" refers to processing that can be executed with respect to document data, and is processing that can be realized by respective functions, mainly of an image processing apparatus having complex functions. For example, a task of the image processing apparatus can refer to scanning of originals, printing of document data, sending (e.g., electronic mails, faxes, files), storage into disks (storage into hard disks inside and outside of the image processing apparatus) or the like, but it is not particularly limited to these. Further, the term "document data" includes text data and image data.

In the processing flow, it is also possible to define the processing of a plurality of applications that can provide various tasks, in addition to the image processing apparatus that provides the above-described tasks. The applications can include applications operating on the image processing apparatus, and applications operating on an information processing apparatus such as a personal computer (PC).

By including the tasks of the applications operating on a plurality of devices such as the image processing apparatus and the information processing apparatus and the like, the processing flow operates as a work flow. Once the processing flow has been created, a combination of various frequently-used tasks can be executed without cumbersome operations.

On the other hand, applications which can create the processing flow, by using a keyboard or a mouse of the information processing apparatus such as a PC is also provided. Since the keyboard or the mouse is used, such applications are superior in operability to those in which the processing flow is created by a user interface (UI) such as a touch panel of the image processing apparatus. However, even in such applications, there is a problem in operability.

Since the processing flow includes settings of various tasks, there are many parameters that the user needs to set. Generally, an application provides setting UI to have specified values of parameters so that the user can execute tasks even if the user does not change the parameters. Accordingly, the parameters that the user must set can be reduced.

However, regarding the parameters corresponding to environment of each user, the parameters to be set by the user cannot be reduced, since the tasks cannot be executed using the specified values. For example, the parameters include path to a server that sends the document data and authentication information for the server. In the processing flow, it is possible to include settings of tasks for sending the document data to a plurality of servers.

Further, as described above, tasks to be processed by various devices can be included in the processing flow. The paths to these devices become also necessary. Therefore, in the setting UI of an application, many input fields for setting parameters are displayed. However, due to this, it is difficult for the user to find the parameters that the user wants to set.

Further, since there are many parameters, it is difficult for the user to select an input field of a parameter that the user wants to set. Further, there is a problem in operability such that the user is likely to lose sight of the setting in the processing flow that is currently performed.

Japanese Patent No. 2549268 discusses a technique for allowing users to easily find data to be input by the user. In Japanese Patent No. 2549268, a user interface (UI) is divided into two panes (left and right sides), and on the left side, parameter names are displayed in a list in an alphabetical order.

On the right side, a plurality of input fields for performing settings of parameters is provided. When a parameter name of the list on the left side is selected by a user, an input field for setting the selected parameter is displayed in the pane on the right side. Accordingly, the user can easily find the data and select the input field.

However, in the above-described prior art, in a case of changing to another input field by a user's operation, in the pane on the right side, a selected position of the list of the pane on the left side does not vary in response to this operation. Therefore, in the case where the user checks the pane on the left side, after having selected another input field by performing operation of the pane on the right side, different parameters are selected between the pane on the left side and the pane on the right side.

Accordingly, in the case where there are many parameters to be set, the user is likely to lose sight of the parameter that the user is currently setting. Further, in the prior art, the parameters are only displayed in a list in the alphabetical order in the pane on the right side. With respect to the processing flow having a plurality of tasks with a structure such as a processing flow, the prior art cannot be applied to confirm the entire structure.

SUMMARY OF THE INVENTION

The present invention is directed to an information processing apparatus, and a display control method capable of preventing a user from losing sight of a parameter that the user is currently setting.

According to a first aspect of the present invention, an information processing apparatus includes a display unit configured to display a user interface including a structure display area where a data structure is displayed as respective nodes in a tree-like form, and a detailed setting display area where settings represented at nodes in the same hierarchy displayed in the structure display area are displayed for each tab, and fields for setting items are displayed in respective tabs; and a management unit configured to manage the respective nodes and the respective tabs in association with each other, wherein the display unit, when detecting that a node in the structure display area is selected by a user's operation, identifies a tab associated with the selected node via the management unit and displays the tab in the detailed setting display area, and when detecting that a tab in the detailed setting display area is selected by a user's operation, identifies a node associated with the selected tab via the management unit and displays the tab in the structure display area in a selected state.

According to the present invention, it is possible to prevent losing sight of a parameter that the user is currently setting.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

FIG. 5A illustrates an example of a task definition list managed by a task data management unit 455. FIG. 5B illustrates an example of a task definition stored in a column 502 of a task definition list 500.

FIG. 8 illustrates an example of a UI control management table managed by a UI data management unit 456 according to a first embodiment.

FIG. 11 illustrates an example of the UI control management table managed by the UI data management unit 456 according to a second embodiment.

FIG. 17 illustrates a UI after "Taro" is input into an input field 1701, in a state of the UI of FIG. 15.

FIG. 18 illustrates a UI for creating the processing flow displayed by the UI unit 454 according to the third embodiment.

DESCRIPTION OF THE EMBODIMENTS

Various embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1:
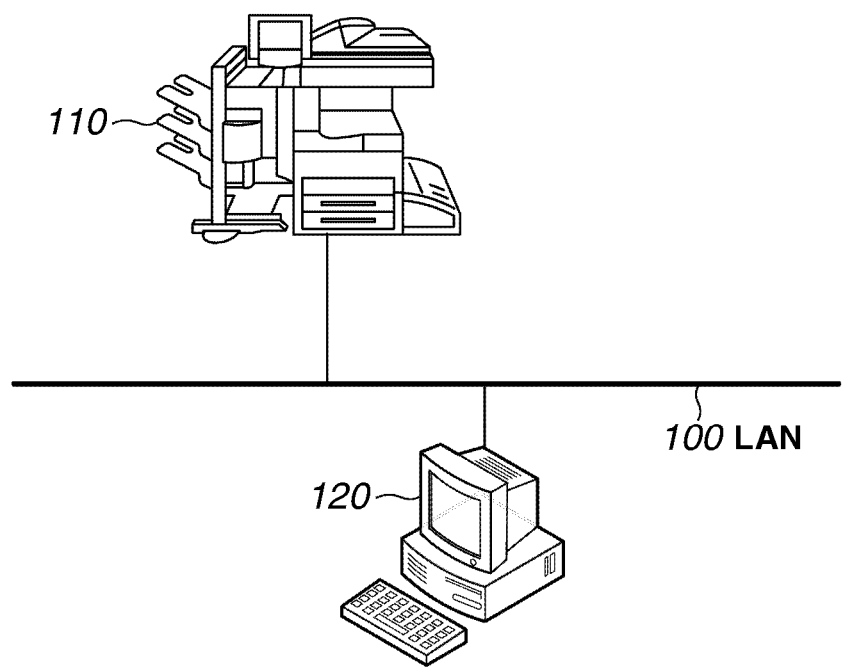
FIG. 1 illustrates an example of a system configuration of a system according to an embodiment of the present invention.

FIG. 1 illustrates an example of a system configuration of a system according to an embodiment of the present invention. As illustrated in FIG. 1, a MFP 110 and a PC 120 are connected to a local area Network (LAN) 100 including Ethernet (registered trademark) and the like. The PC 120 is an example of an information processing apparatus.

The MFP 110 has a copying function. At the same time, the MFP 110 has a data transmission function for reading original images, and transmitting the read and obtained document data to a designated apparatus on the LAN 100, using File Transfer Protocol (FTP) or Service Message Block (SMB) protocol. Further, the MFP 110 can create an e-mail using the document data as an attached file, and can send the e-mail utilizing an e-mail server (not illustrated). However, in the system according to the present embodiment, it is not limited to a number of these constitutional devices.

In the present embodiment, the LAN is used as a connection method, but it is not limited thereto. For example, an arbitrary network such as a wide area network (WAN) (public line), a serial transmission system such as a universal serial bus (USB), and a parallel transmission system such as Centronics or Small Computer System Interface (SCSI) can also be used.

Figure 2:
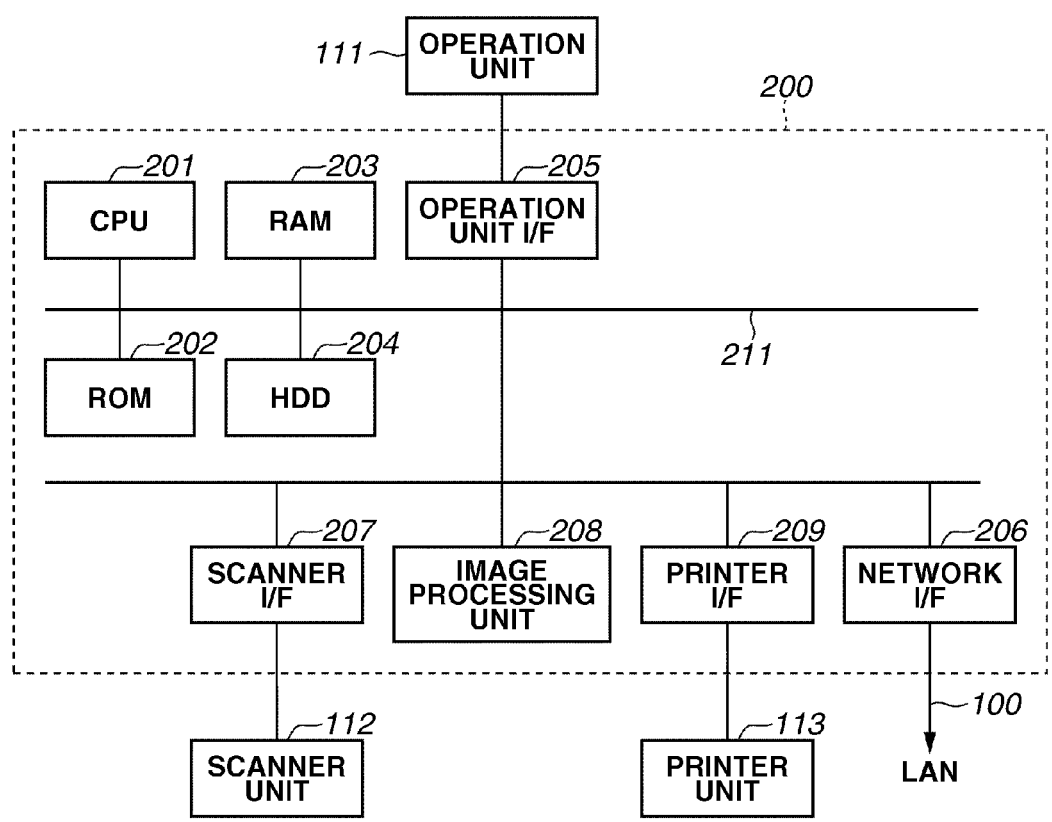
FIG. 2 is a block diagram illustrating an example of a hardware configuration of an MFP 110.

FIG. 2 illustrates an example of a hardware configuration of the MFP 110. The MFP 110 includes components such as a scanner unit 112 serving as an image input device, a printer unit 113 serving as an image output device, a controller 200 that performs control of the MFP 110, and an operation unit 111.

The scanner unit 112 is a device that can read an image on an original to generate image data. The original is set on an original feeder, and an instruction for reading the original is given from the controller 200 to the scanner unit 112.

The scanner unit 112, upon receiving the instruction, feeds original sheets one by one from the original feeder, and performs operation for reading the originals. The method for reading the originals may be a method of scanning the original by placing the original on a glass surface (not illustrated) and moving an exposure unit, other than the automatic feeding method by the original feeder.

The printer unit 113 is an image forming device that forms an image on a sheet based on image data received from the controller 200. In the present embodiment, the image formation method may be an inkjet method or the like, in addition to an electrophotographic method using photosensitive drums or photosensitive belts.

While the controller 200 is electrically connected to the operation unit 111, the scanner unit 112, and the printer unit 113, the controller 200 is connected to the LAN 100 via a network I/F 206. In other words, the controller 200 is connected to other devices by way of the LAN 100. Accordingly the MFP 110 can communicate with other devices according to the hyper text transfer protocol (HTTP).

A central processing unit (CPU) 201 integrally controls accesses to various types of connected devices and accesses from other devices, based on a control program or the like stored in a read-only memory (ROM) 202. The CPU 201 also integrally controls various kinds of processing performed inside the controller 200. The control also includes an execution of a program for realizing the flowcharts described below.

The ROM 202 stores therein a boot program for the apparatus. A random-access memory (RAM) 203 is a system work memory for the CPU 201 to operate, and is also a memory for temporarily storing the image data. The RAM 203 includes a region where stored contents are held even after power-off of the apparatus main body by a backup of power source, and a region where stored contents are erased after power-off.

A hard disk drive (HDD) 204 can store the system software and the image data.

An operation unit I/F 205 is an interface unit for connecting a system bus 211 and an operation unit 111. The operation unit I/F 205 receives image data for displaying thereof on the operation unit 111 from the system bus 211, outputs the image data to the operation unit 111, and also outputs information input from the operation unit 111 to the system bus 211.

The network I/F 206 is connected to the LAN 100 and the system bus 211 to perform input/output of the information.

A scanner I/F 207 performs correction, processing, and edition on image data received from the scanner unit 112. The scanner I/F 207 has a function for determining whether the received image data is color original or monochrome original, character original or photograph original.

An image processing unit 208 performs direction change processing, image compression processing, decompression processing of the image data. Further, the image processing unit 208 can combine images stored in the HDD 204 into a sheet of images.

The printer I/F 209 receives image data sent from the image processing unit 208, and subjects the image data to image formation while referring to attribute data attached to the image data. The image data after having subjected to the image formation is output to the printer unit 113.

In the present embodiment, the MFP is a network MFP that can execute a user interface (UI) display, but may be an image processing apparatus other than the MFP, such as a general-purpose computer to which a general-purpose scanner, a general-purpose printer, and the like are connected.

Figure 3:
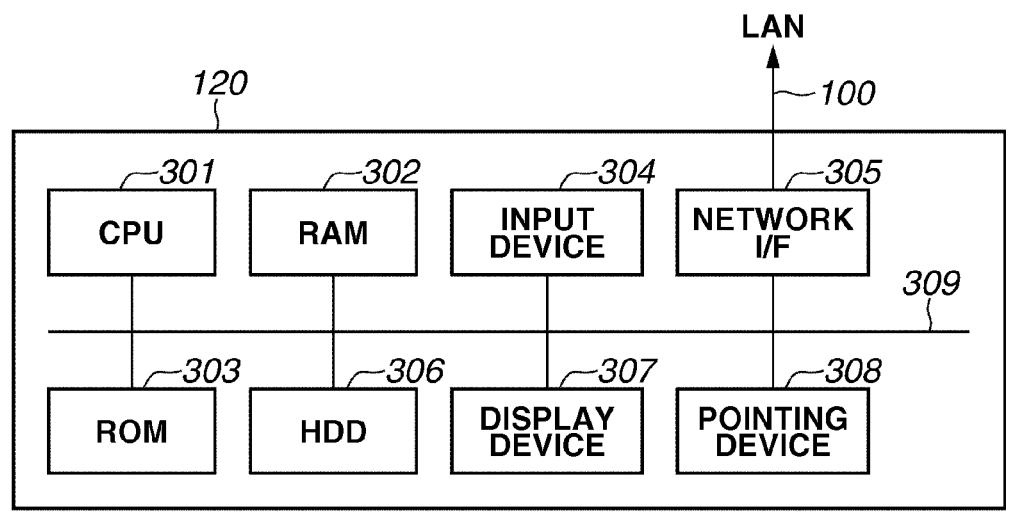
FIG. 3 is a block diagram illustrating an example of a hardware configuration of a PC 120.

FIG. 3 illustrates an example of hardware configuration of the PC 120. In FIG. 3, a CPU 301, a RAM 302, a ROM 303, a network I/F 305, and a hard disk drive (HDD) 306 are connected via a system bus 309 so that they can communicate with one another.

Further, a display device 307 such as a cathode ray tube (CRT), an input device 304 such as a keyboard, and a pointing device 308 such as a mouse are connected via the system bus 309 so that they can communicate with one another.

In the ROM 303 or the HDD 306, a control program such as an operating system is stored. The CPU 301 reads the control program from the ROM 303 or the HDD 306 onto the RAM 302 as needed, and functions as a computer by executing the control program.

Further, the CPU 301 performs display of various types of information via the display device 307, and accepts user instructions via the input device 304 or the pointing device 308. Further, the CPU 301 performs communication with other apparatuses on the LAN 100 via the network I/F 305.

Figure 4:
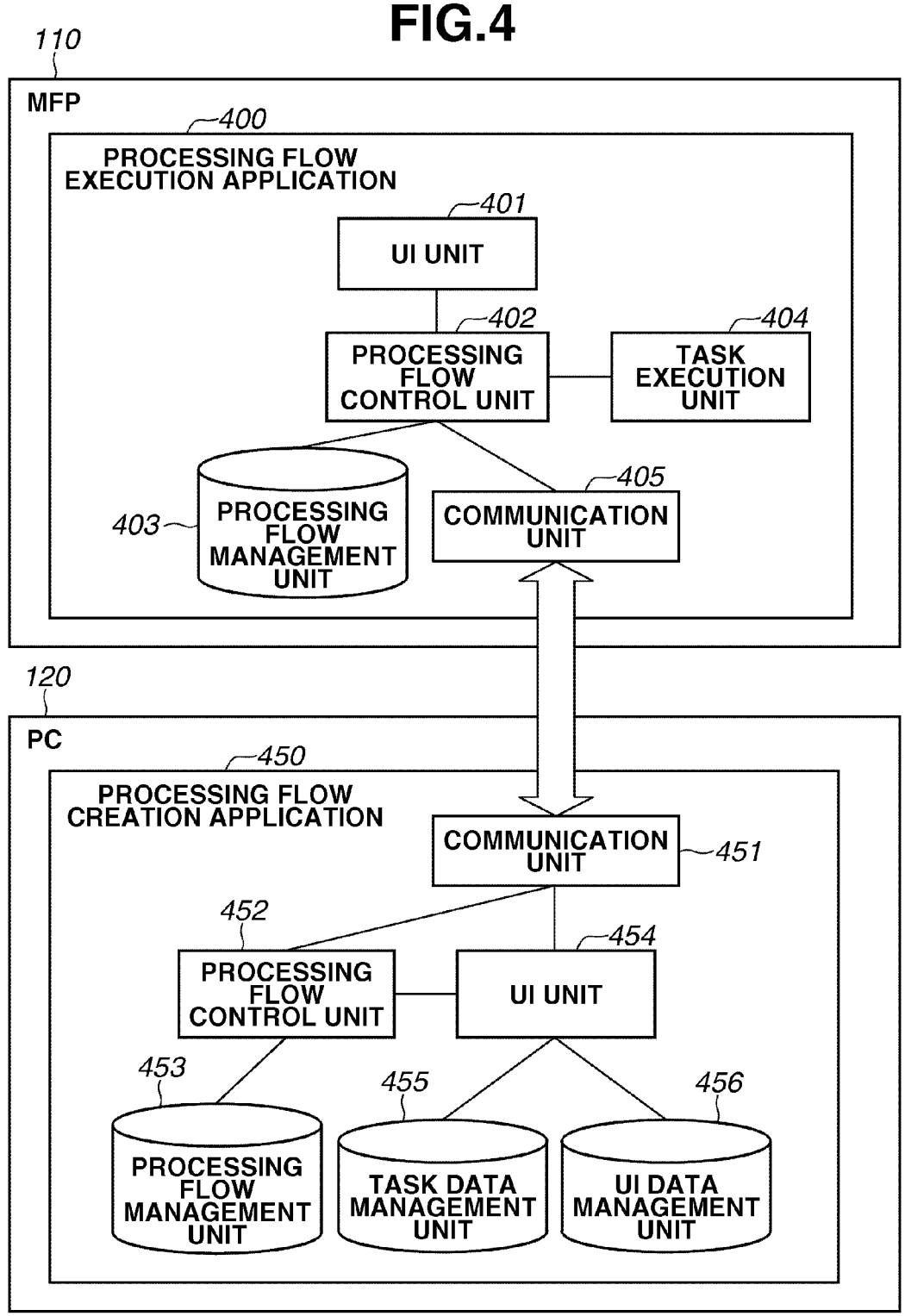
FIG. 4 is a block diagram illustrating an example of software configurations of the MFP 110 and the PC 120.

FIG. 4 illustrates examples of software configurations of the MFP 110 and the PC 120. Software modules illustrated in FIG. 4 are realized (functioned) by reading programs stored in the HDDs 204/306, which the MFP 110/PC 120 have respectively, onto the RAMS 203/302 and executing the programs by the CPUs 201/301.

The MFP 110 has a processing flow execution application 400. The processing flow execution application 400 includes a UI unit 401, a processing flow control unit 402, a processing flow management unit 403, a task execution unit 404, and a communication unit 405.

The UI unit 401 performs display on the operation unit 111, via the operation unit I/F 205, and processes an input from a user from the operation unit 111. The UI unit 401 displays the processing flow managed by the processing flow management unit 403 as a button. Further, the UI unit 401, when the button is pressed by an operation of the user, detects it, and instructs the processing flow control unit 402 to execute the processing flow.

The processing flow control unit 402 performs analysis of the processing flow. The processing flow control unit 402, when an execution of the processing flow is instructed from the UI unit 401, acquires the processing flow from the processing flow management unit 403. Then, the processing flow control unit 402 performs analysis of the acquired processing flow, and divides the acquired processing flow into respective tasks. Further, the processing flow control unit 402 notifies the task execution unit 404 to execute respective tasks in the order designated in the processing flow. Further, the processing flow control unit 402 receives the processing flow from the communication unit 405, and instructs the processing flow management unit 403 to register the processing flow.

The processing flow management unit 403 stores therein the processing flow, and performs reading and writing of the processing flow according to instructions from the processing flow control unit 402.

The task execution unit 404 executes tasks received from the processing flow control unit 402. The tasks executed by the task execution unit 404 refer to scanning of originals, printing, transmission of document data (e.g., electronic mails, facsimiles, files), and storage to disks (storage to hard disks located inside and outside of the MFP 110).

The communication unit 405 performs communication with a communication unit 451 of the PC 120 described below via the network I/F 206. The communication unit 405 receives a processing flow from the communication unit 451 of the PC 120, and transfers the processing flow to the processing flow control unit 402.

The PC 120 contains the processing flow creation application 450. The processing flow creation application 450 includes the communication unit 451, a processing flow control unit 452, a processing flow management unit 453, a UI unit 454, a task data management unit 455, and a UI data management unit 456.

The communication unit 451 performs communication with the communication unit 405 in the MFP 110 via the network I/F 305. The communication unit 451 sends the processing flow stored in the processing flow management unit 453 to the communication unit 405 in the MFP 110, according to an instruction of the processing flow control unit 452.

The processing flow control unit 452 performs analysis of the processing flow. The processing flow control unit 452 converts data of the tasks transferred from the UI unit 454 into a processing flow. Further, the processing flow control unit 452 analyzes the processing flow stored in the processing flow management unit 453, and divides the processing flow into tasks and transfers the tasks to the UI unit 454.

The processing flow management unit 453 stores therein the processing flow, and performs reading or writing of the processing flow, according to the instruction from the processing flow control unit 452.

The UI unit 454 performs display on the display device 307, and processes an input of the user from the input device 304 or the pointing device 308. The UI of the processing flow creation application 450 will be described below.

The task data management unit 455 manages a task definition list. The task definition list will be described below with reference to FIGS. 5A and 5B. The UI data management unit 456 manages a UI control data list. The UI control data list will be described below with reference to FIG. 8.

FIG. 5A illustrates an example of the task definition list managed by the task data management unit 455. In the present embodiment, a table format is used as a diagrammatic representation, but a comma separated value (CSV) format or a text file in an extensible markup language (XML) may be used.

The task definition list 500 is composed of two columns, a column 501 and a column 502. One record represents one task. The column 501 represents names of tasks, and stores therein identifiers for identifying the tasks. For example, a task name of a first record is "send SMB".

The column 502 represents detailed definitions of respective tasks. The detailed definition of the task will be described below with reference to FIG. 5B.

FIG. 5B illustrates an example of the task definition stored in the column 502 of the task definition list 500. In this example, a task definition 550 is expressed in XML, but the task definition 550 may be any format, as long as the processing flow creation application 450 can process thereof.

A tag 551 is a "Send" tag, which indicates the task relates to sending. Definition of the task relating to sending is described within the tag. A tag 552 is a "sendName" tag, which indicates a task name of the task relating to sending. In this example, the task name is "send SMB".

A tag 553 and a tag 561 are "step" tags, which represent steps when dividing the processing of the task into units, and the task is executed in the order the steps described in an attribute "no". The processing defined within the tag 553 in which the attribute "no" is "1" is executed when the task is executed, and then the processing defined within the tag 561 in which the attribute "no" is "2" is executed. An attribute "name" of the "step" tag represents a name of the step. The name of the step of the tag 553 is "login".

A tag 554 is an "item" tag, which indicates a parameter necessary for executing the task. A "name" attribute of the "item" tag represents a name of the parameter, and the name of the parameter of the tag 554 is "user name".

A tag 555 is "textItem" tag, which represents that a field for inputting the parameter has a format for inputting with character string. The UI to be displayed by the processing flow creation application 450 will be described below. A tag 556 is "initValue", which represents an initial value of the parameter with parameter name "user name". In the tag 556, the initial value is empty.

A tag 557 is "choiceItem", which represents that a field for inputting the parameter has a choice format. The UI to be displayed by the processing flow creation application 450 will be described below.

A tag 558 is "initValue", which represents an initial value of the parameter with parameter name "authentication type". A value of the tag 558 is "1", which represents that a first value of options is initial value.

A tag 559, and a tag 560 are "choice" tags, which represents options of values which can be taken by the parameter with parameter name "authentication type". An attribute "no" of the "choice" tag represents a number of the option. In other words, a first one of the options of the values which can be taken by the parameter with parameter name "authentication type" is "NTLMv2", and a second one is "Kerberos".

First, upon accepting an activation instruction of the processing flow creation application 450 by the user's operation, the UI unit 454 displays an initial screen (not illustrated) of the processing flow creation application 450.

On the initial screen, the UI unit 454 accepts an instruction for creation of the processing flow, or an instruction for sending the created processing flow to the processing flow execution application 400 in the MFP 110.

Figure 6:
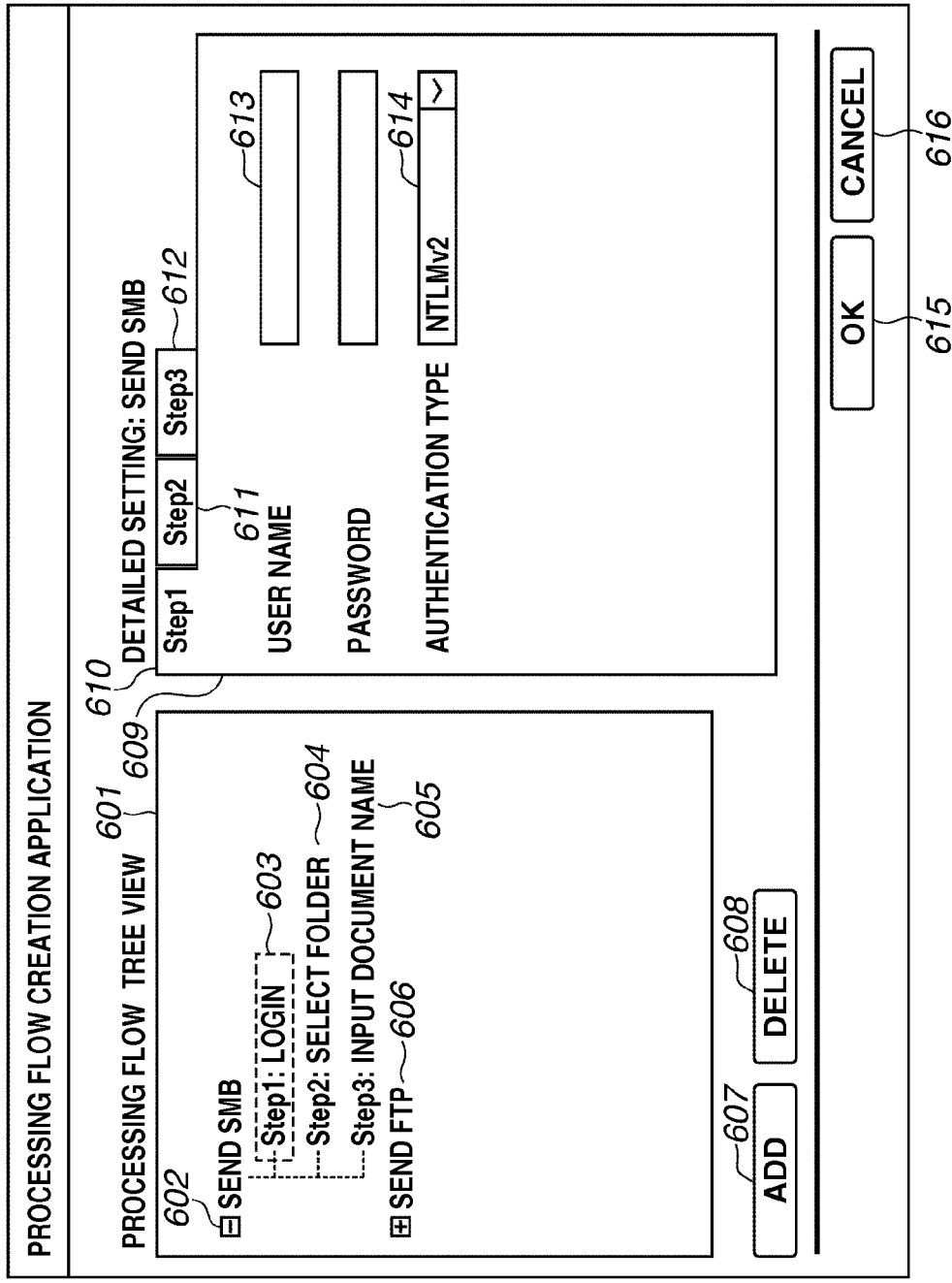
FIG. 6 illustrates an example of a UI in a state where tasks of "send SMB" and "send FTP" have been already added one by one to the processing flow.

Upon accepting an instruction for creation of the processing flow by the user's operation, the UI unit 454 displays the UI for creating the processing flow illustrated in FIG. 6. FIG. 6 illustrates an example of the UI in a state where each one of the tasks of "send SMB" and "send FTP" has been already added to the processing flow. The addition processing of the tasks will be described below with reference to FIG. 7.

A pane 601 is a region where a tree view is displayed. The tasks added to the processing flow are displayed in a tree format. By displaying the tasks in a tree-like manner, the entire structure of the processing flow can be easily understood. The pane 601 is an example of a structure display area.

A node 602 indicates the task of "send SMB" added to the processing flow. The node 602 is a first node at depth 0 in the tree view. That is, the node 602 represents the task to be executed at first in the processing flow.

A node 603 represents a first step defined in the task of "send SMB" added to the processing flow. The first step refers to a step defined in the tag 553 of the task definition 550. The node 603 is a first child node of the node 602 in the tree view.

A node 604 represents a second step defined in the task of "send SMB" added to the processing flow. The node 604 is a second child node of the node 602 in the tree view.

The node 605 represents a third step defined in the task of "Send SMB" added to the processing flow. The node 605 is a third child node of the node 602 in the tree view.

A node 606 indicates the task of "Send FTP" added to the processing flow. The node 606 is a second node at depth 0 in the tree view. That is, the node 606 represents that the task is executed second in the processing flow.

A button 607 is a button for adding a task to the processing flow. When the button 607 is pressed, the UI unit 454 displays the UI (not illustrated) for adding a task. In the UI for adding a task, addition of a task managed by the task definition list 500 is allowed.

A button 608 is a button for deleting a task that has been added to the processing flow, from the processing flow.

A pane 609 is a region for displaying a tab control. In the pane 609, a UI for performing detailed settings of the task added to the processing flow is displayed. The tab control is displayed for each task. Further, in the tab control, it is possible to display a plurality of tab pages.

In FIG. 6, the pane 609 is in a state where the tab control for performing settings of the task of "Send SMB" is displayed. The pane 609 is an example of a detailed setting display area. In the pane 609, the settings indicated in the nodes in the same hierarchy displayed in the pane 601 are displayed for each tab.

A tab page 610 is a tab page for performing settings relating to a first step of "Send SMB". The first step is a step having the step name of "login" defined in the tag 553 of the task definition 550. The tab page 610 is a first tab page of the tab control for performing settings of "Send SMB".

A tab page 611 is a tab page for performing settings relating to a second step of "Send SMB". The tab page 611 is a second tab page of the tab control for performing settings of "Send SMB".

A tab page 612 is a tab page for performing settings relating to a third step of "Send SMB". The tab page 612 is a third tab page of the tab control for performing settings of "Send SMB".

An input field 613 is an input field for setting a value of a first parameter (setting item) of the step having the step name "login". The input field 613 is a field corresponding to "textItem" defined by the tag 555 in the task definition 550, and accepts an input of character string.

An input field 614 is an input field for setting a value of a third parameter (setting item) of the step having the step name of "login". The input field 614 is a field corresponding to "choiceItem" defined by the tag 557 in the task definition 550, and accepts the choice by the user. Options are "NTLMv2" and "Kerberos" defined by "choice" tags of the tag 559 and the tag 560.

As described above, even when there are a great number of input fields, by displaying them divided into tab pages on a step-to-step basis, scrolling display can be avoided more than displaying all input fields in a list. As a result, the user can more easily find an item which the user wants to set.

Further, since the user can change items from step to step by choosing the pane on the right side, the user can more easily reach the item that the user wants to set.

A button 615 is a button for registering the processing flow. When the button 615 is pressed by the user's operation, the UI unit 454 transfers the set task definition or a parameter of the task to the processing flow control unit 452, and instructs the processing flow control unit 452 to create the processing flow.

The processing flow control unit 452 creates the processing flow from the task definition or the parameter of the task transferred from the UI unit 454, and instructs the processing flow management unit 453 to register the processing flow. The processing flow management unit 453 receives an instruction from the processing flow control unit 452, and performs writing operation of the processing flow.

A button 616 is a button for cancelling creation of the processing flow. When the button 616 is pressed by the user's operation, the UI unit 454 discards the set parameter or the like, and returns to the initial screen.

Figure 7:
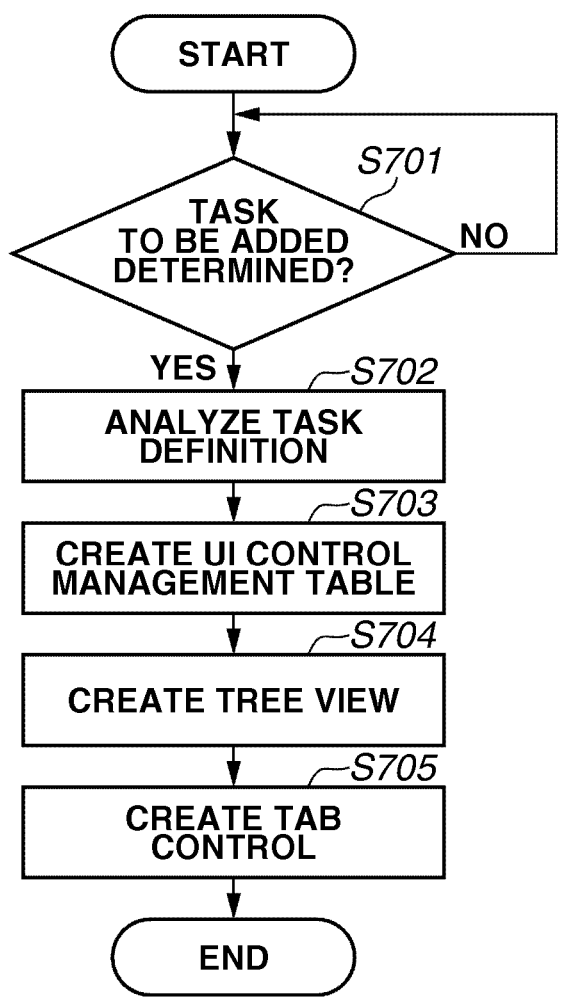
FIG. 7 is a flowchart illustrating processing of a processing flow creation application 450 from when an instruction for addition of the task has been accepted to when the task is added to the processing flow in the UI for adding tasks described above.

FIG. 7 is a flowchart illustrating the processing of the processing flow creation application 450 from when an instruction for addition of a task is accepted to when the task is added to the processing flow in the UI for adding the above-described task.

In step S701, the UI unit 454 determines whether an instruction for adding a task to the processing flow by the user's operation has been accepted. If the instruction for addition of the task has been accepted (YES in step S701), the UI unit 454 advances the processing to step S702. If the instruction for addition of the task has not been accepted (NO in step S701), the UI unit 454 stands by until the instruction is accepted.

In step S702, the UI unit 454 acquires a task definition selected by the user from the task data management unit 455. The UI unit 454 analyzes the acquired task definition, and advances the processing to step S703.

In step S703, the UI unit 454 creates a UI control management table according to the analyzed task definition, and instructs the UI data management unit 456 for storage. The UI data management unit 456 stores the UI control management table, according to the instruction from the UI unit 454.

FIG. 8 illustrates an example of the UI control management table managed by the UI data management unit 456 according to the first embodiment. Although a table format is used as a diagrammatic representation in the example, it is not limited to the format, only if the tree view and the tab control only can be associated with each other.

The UI management table is composed of columns from a column 801 to a column 805. The column 801 represents tasks added to the processing flow. Task names and steps are stored therein.

A column 802 represents where the node is displayed among nodes at depth 0 in the tree view to be displayed on the pane 601. Taking the task "Send SMB" in the column 801 as an example, a value of the column 802 is "1". Therefore, it indicates that the task "Send SMB" is displayed in a first node at depth 0.

A column 803 represents where the step is displayed among nodes at depth 1 in the tree view to be displayed on the pane 601. Taking a step of "Step 2" in the column 801 as an example, a value of the column 802 is "1", and a value of the column 803 is "2". Therefore, it indicates that the step is displayed at a second node at depth 1 as a child node of a first node at depth 0.

A column 804 represents a tab control to be displayed on the pane 609. A tab control is created for each task to be added to the SMB processing flow.

A column 805 represents which tab page of the tab control indicated in the column 804. Taking a step of "Step 2" in the column 801 as an example, a value of the column 804 is "1", and a value of the column 805 is "2". Therefore, it indicates that the step is to be displayed at a second tab page in a first tab control.

Returning to FIG. 7, in step S704, the UI unit 454 creates a tree view on the pane 601, according to the task definition analyzed in step S702. In step S705, the UI unit 454 creates the tab control on the pane 609, according to the task definition analyzed in step S702.

Addition of the tasks to the processing flow is performed in a manner described above. As described above, the UI in FIG. 6 is a UI that is in a state where the tasks of "Send SMB" and "Send FTP" are added.

Figure 9:
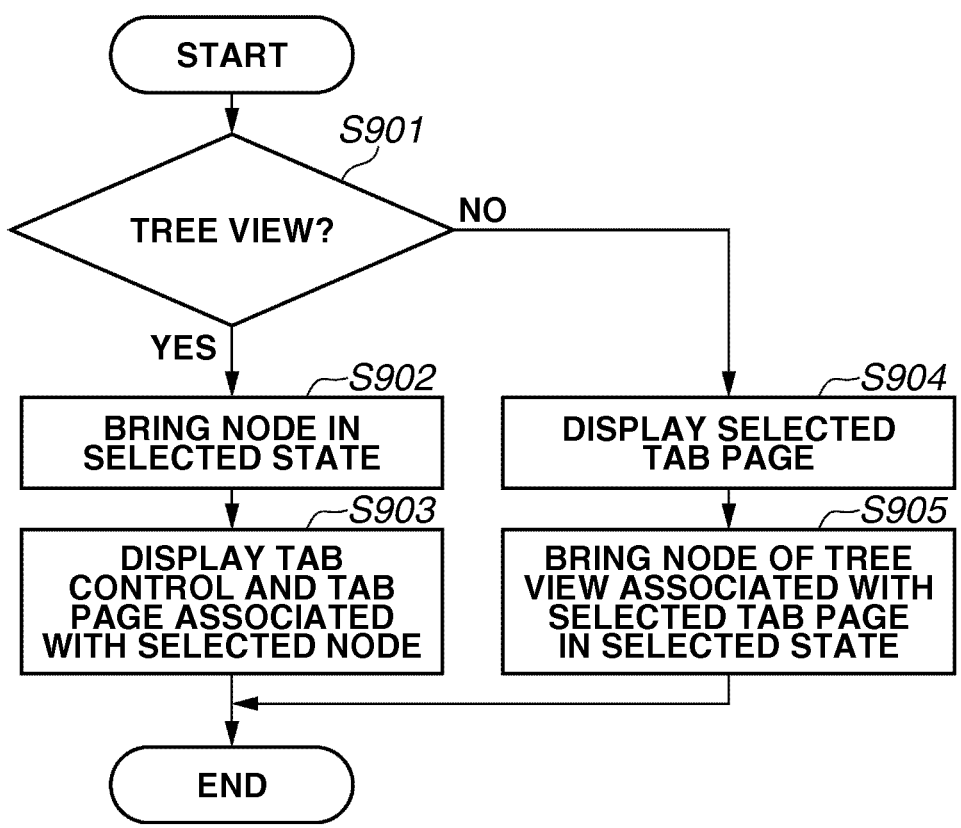
FIG. 9 is a flowchart illustrating an example of display control processing by the processing flow creation application 450, from when a pane 601 or a pane 609 is selected with a mouse by the user's operation.

Next, the processing when the pane 601 or the pane 609 is selected with a mouse or the like by the user will be described. FIG. 9 is a flowchart illustrating an example of display control processing in the processing flow creation application 450 from when the pane 601 or the pane 609 is selected with the mouse or the like by the user's operation.

The UI unit 454 in the processing flow creation application 450 detects a plurality of operations by the user, such as button pressing and the like. However, in the flowchart, description will be given of only the processing performed when detecting that the pane is selected with the mouse or the like, which is a feature of the example.

In step S901, the UI unit 454 determines whether the selected pane is the pane 601 or the pane 609. If the pane 601 is selected (YES in step S901), the UI unit 454 advances the processing to step S902. If the pane 609 has been selected (NO in step S901), the UI unit 454 advances the processing to step S904.

In step S902, the UI unit 454 brings the node in the tree view of the pane 601 selected by the user's operation into a selected state, and advances the processing to step S904. For example, the UI unit 454, when the node 605 is selected by the user's operation, brings the node 605 into a selected state.

In step S903, the UI unit 454 identifies a tab control and tab pages associated with the node selected by the user's operation, and displays the tab control and tab pages on the pane 609. The UI unit 454, first, acquires the UI control management table from the UI data management unit 456.

Then, the UI unit 454 searches for the tab control and the tab pages associated with the node selected by the user. Then, the UI unit 454 displays the tab pages of the tab control obtained as a result of the search. For example, the UI unit 454 finds that, if the node selected by the user is the node 602, the node 602 is a first record of the UI control management table in FIG. 8. In this case, the UI unit 454 displays a first tab control.

The UI unit 454, since there are no applicable tab pages in the UI control management table in FIG. 8, displays the tab page 610 (i.e., the first tab page). The UI unit 454, if the node selected by the user's operation is the node 605, finds that the node 605 is a fourth record in the UI control management table in FIG. 8. In this case, the UI unit 454 displays the tab page 612, which is a third tab page of the first tab control.

The processing in step S902 and step S903 is an example of the processing of a first display control.

In step S904, the UI unit 454 displays the tab page selected by the user's operation, and advances the processing to step S905. For example, the UI unit 454, if the tab page 612 is selected, displays the tab page 612.

In step S905, the UI unit 454 specifies the node associated with the tab page selected by the user's operation, and brings the node of the pane 601 into a selected state. The UI unit 454 first acquires the UI control management table from the UI data management unit 456. Then, the UI unit 454 searches for a node associated with the tab page selected by the user.

Then, the UI unit 454 brings the node obtained as a result of the search into a selected state. For example, the UI unit 454, if the tab page 612 is selected by the user's operation, finds that the tab page 612 is a fourth record in the UI control management table in FIG. 8. In this case, the UI unit 454 brings the node 605, which is a third child node of the nodes at depth 0 in the tree view, into a selected state.

The processing in step S904 and step S905 is an example of the processing of a second display control.

Figure 10:
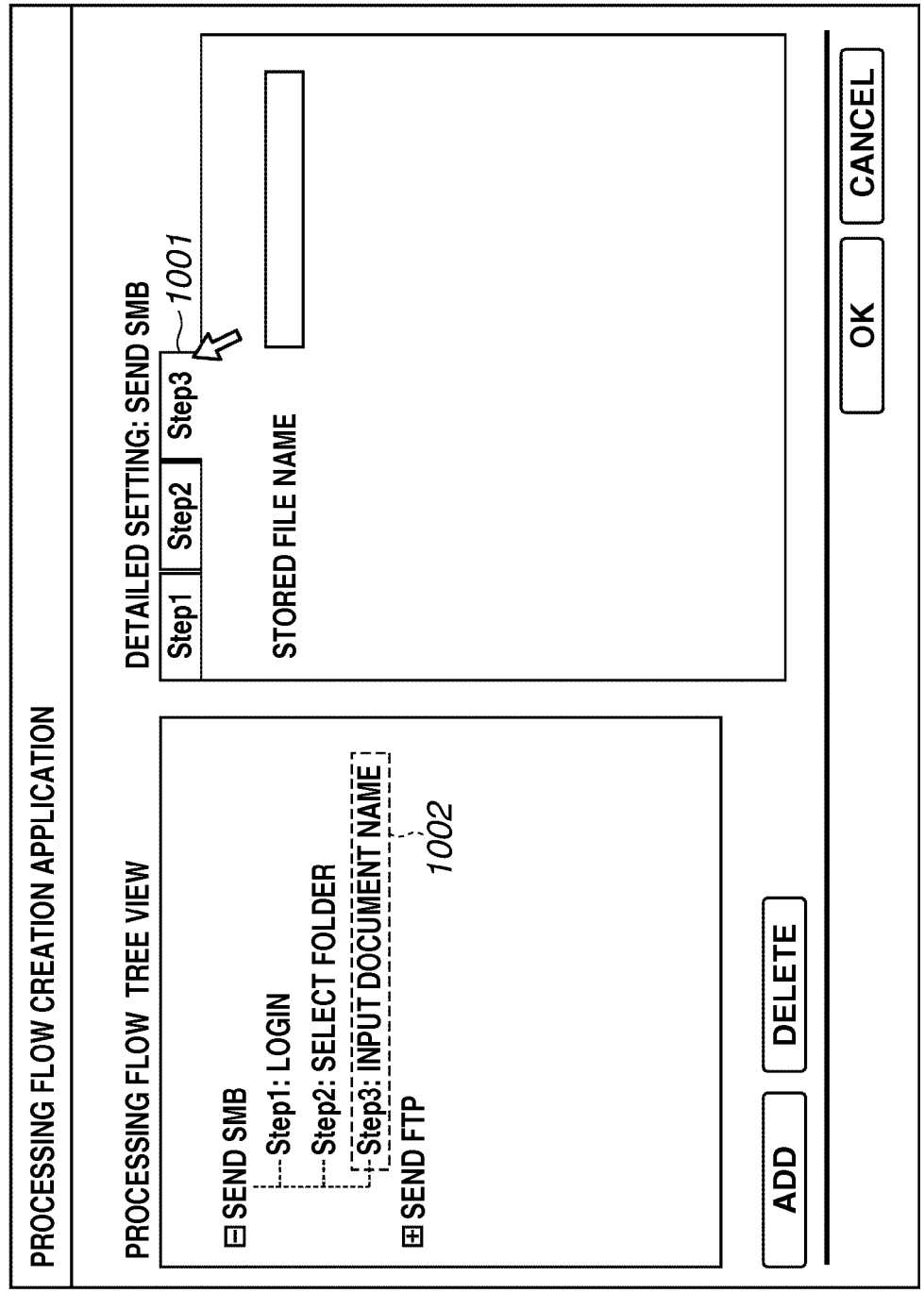
FIG. 10 illustrates a UI after a tab page 612 is selected by the user, in the UI in a state of FIG. 6.

FIG. 10 illustrates the UI after the tab page 612 is selected by the user, when the UI is in the state indicated in FIG. 6. The tab page 612 is displayed at the front face as illustrated in a tab 1001. The node 605 associated with the tab page 612 is in a selected state as illustrated in a node 1002.

As described above, the tree view displayed in the pane 601 and the tab control displayed in the pane 609 are synchronized with each other. Accordingly, without difference of the positions where the left and right panes are displayed by the user's operation, the user is less likely to lose sight of the parameter that the user is currently setting.

Next, a second embodiment will be described. In the first embodiment, synchronization between the nodes in the tree view and the tab pages in the tab control has been described. In the second embodiment, further synchronization between the nodes and the input fields in the tree view will be described. The system configuration, and hardware configuration, and software configuration of the MFP 110, and the PC 120 are similar to those in the first embodiment.

Regarding the processing for adding tasks, only differences from the first embodiment will be described. In the first embodiment, the UI control management table created in step S703 when adding a task is the one illustrated in FIG. 8. However, in the second embodiment, it is the UI control management table illustrated in FIG. 11. Only differences from FIG. 8 will be described. FIG. 11 illustrates an example of the UI control management table managed by the UI data management unit 456 according to the second embodiment.

A column 1101 represents at which node a record is to be displayed in the nodes at depth 2 in the tree view. Taking a record 1103 as an example, it is to be displayed at a first node of the nodes at depth 2. A column 1102 represents what number of the input fields a record is displayed in the tab pages. Taking the record 1103 as an example, it will be found that it is a first input field.

In the first embodiment, the tree view created in step S704 up to depth 1 is displayed. In the second embodiment, as illustrated in FIG. 12, the tree view up to depth 2 is displayed.

Figure 12:
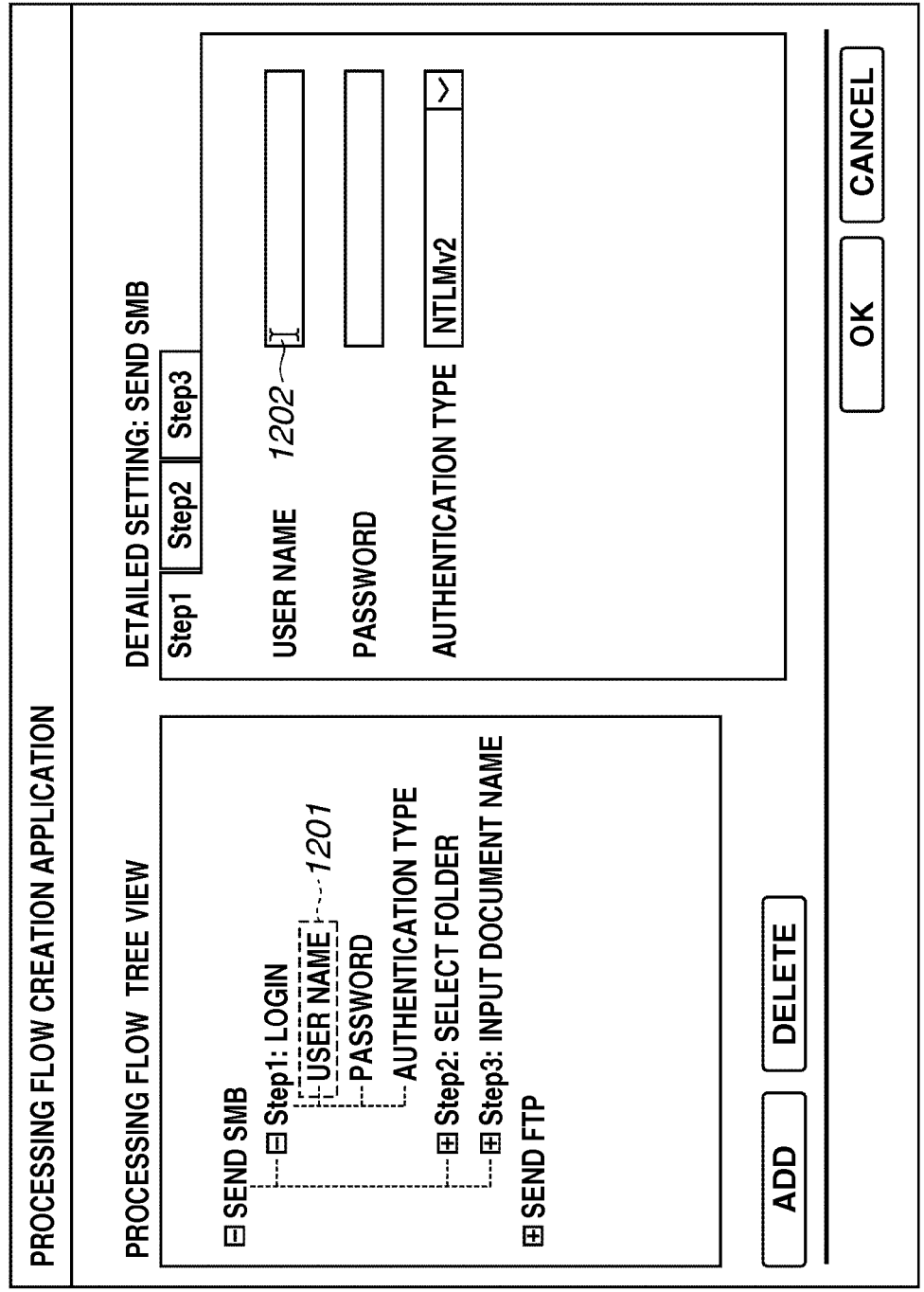
FIG. 12 illustrates a UI for creating the processing flow which a UI unit 454 according to the second embodiment displays.

FIG. 12 illustrates a UI for creating the processing flow that the UI unit 454 displays. FIG. 12 is the UI that is in a state where each of the tasks of "Send SMB" and "Send FTP" has been already added to the processing flow.

A node 1201 represents a parameter with the parameter name "user name". The node 1201 is in a selected state. An input field 1202 is a field for setting a parameter with the parameter name "user name". The cursor is positioned at the input field 1202.

Herein, the phrase that "the cursor is positioned at" refers to a status where an input by the user can be accepted. When the cursor is positioned at the input field 1202, the UI unit 454, upon accepting an input of character string by the user's operation via the input device 304 such as a keyboard, displays the input character string on the input field 1202.

Figure 13:
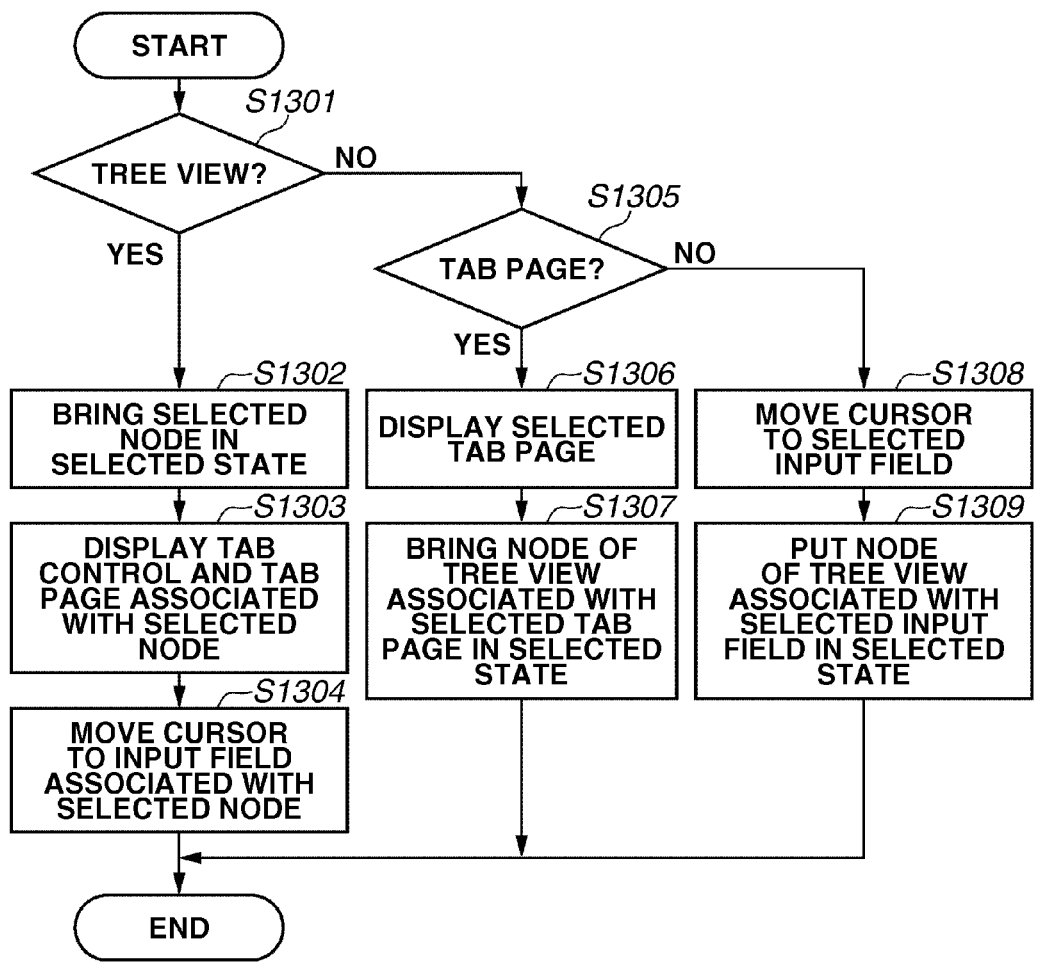
FIG. 13 is a flowchart illustrating a processing flow creation application 450, from when a pane is selected with the mouse or the like, according to the second embodiment.

FIG. 13 is a flowchart of the processing flow creation application 450 from when a pane is selected with the mouse or the like, according to the second embodiment. Only the processing different from the first embodiment will be described.

The processing from step S1301 to step S1303 is similar to the processing from step S901 to step S903, and thus descriptions thereof will not be repeated.

In step S1304, the UI unit 454 specifies an input field associated with the node selected by the user's operation, and brings the input field into a selected state. The UI unit 454 first acquires the UI control management table from the UI data management unit 456. Then, the UI unit 454 searches for an input field associated with the node selected by the user. Then, the UI unit 454 moves the cursor to the input field obtained as a result of the search.

For example, the UI unit 454, if the node 1201 is selected by the user's operation, finds that the node 1201 is a third record of the UI control management table in FIG. 11. In this case, the UI unit 454 moves the cursor to a first input field 1202 in the first tab page.

In step S1305, the UI unit 454 determines which of a tab page and an input field is selected. If the tab page is selected (YES in step S1305), the UI unit 454 advances the processing to step S1306. If the input field has been selected (NO in step S1305), the UI unit 454 advances the processing to step S1308.

The processing in step S1306 and step S1307 is similar to the processing in step S904 and step S905, and thus descriptions thereof will not be repeated.

In step S1308, the UI unit 454 moves the cursor to the selected input field. For example, if the input field 1202 is selected, the UI unit 454 moves the cursor to the input field 1202.

In step S1308, the UI unit 454 specifies a node in the tree view associated with the input field selected by the user's operation, and brings the node into a selected state.

The UI unit 454 first acquires the UI control management table from the UI data management unit 456. Then, the UI unit 454 searches for a node associated with the input field selected by the user. Then, the UI unit 454 brings the node obtained as a result of the search into a selected state.

For example, the UI unit 454, if the input field 1202 is selected by the user's operation, finds that the node is a third record in the UI control management table in FIG. 11. In this case, the UI unit 454 brings a first node 1201 at depth 3 into a selected state.

Figure 14:
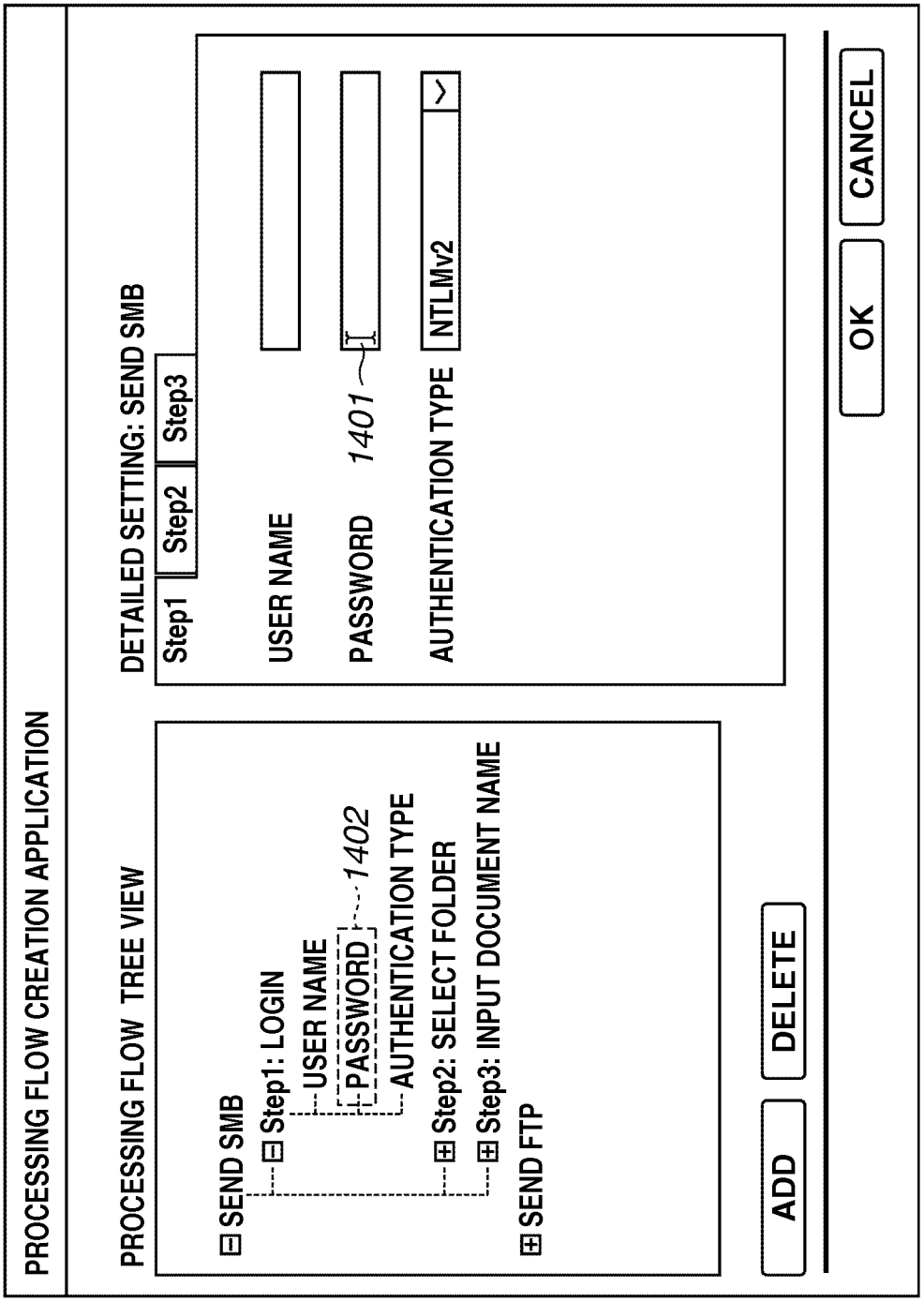
FIG. 14 illustrates a UI after an input field 1401 is selected by the user's operation, when the UI is in a state of FIG. 12.

FIG. 14 illustrates, when the UI is in a state in FIG. 12, a UI after an input field 1401 is selected by the user's operation.

The input field 1401 is a field for setting a parameter with the parameter name "password". The cursor has moved from the input field 1202 to the input field 1401.

A node 1402 represents a parameter with the parameter name "password". The selected state has moved from the node 1201 to the node 1402.

As described above, the tree view and the tab control are synchronized with each other. Input fields arranged in the tab control and the tree view are synchronized with each other. Therefore, the user can easily select a parameter which the user wants to set. Further, without difference of the positions displayed on the left and the right panes by the user's operation, the user is less likely to lose sight of the parameter that the user is currently setting.

In the second embodiment, synchronization when a node in the tree view and an input field arranged on the tab control are selected has been described. In a third embodiment, synchronization in a case where settings to the input fields have been performed by the user's operation will be described. The system configuration, hardware configuration, and software configuration of the MFP 110, and the PC 120 are similar to those in the first embodiment or in the second embodiment. Regarding the processing for task addition, differences from those in the second embodiment will be described.

In the second embodiment, the tree view is created according to the analyzed task definition in step S704 during the task addition, but there is no difference depending on whether an initial value is present. In the third embodiment, regarding parameters having the initial values, the nodes are not displayed. Regarding the parameters having no initial values, the nodes are displayed similarly to the second embodiment.

Figure 15:
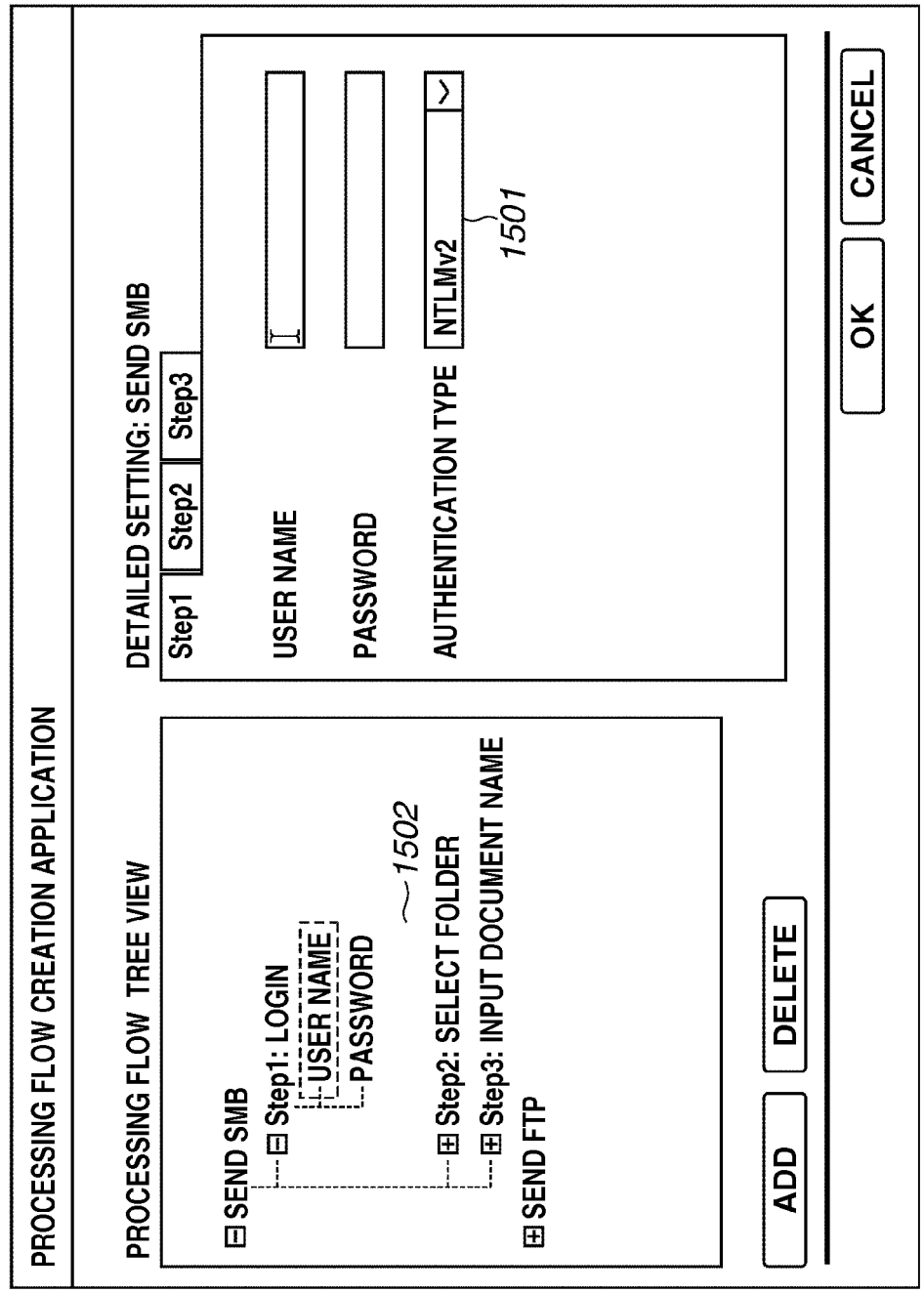
FIG. 15 illustrates a UI for creating a processing flow according to a third embodiment.

FIG. 15 illustrates a UI for creating the processing flow, according to the third embodiment. FIG. 15 is the UI in a state where each of the tasks of "Send SMB" and "Send FTP" has been already added to the processing flow.

An input field 1501 is a field for setting the parameter with the parameter name "authentication type". "NTLMv2" is set as an initial value for the input field 1501.

A node 1502 represents a parameter with the parameter name "authentication type". However, since an initial value is set for the parameter with the parameter name "authentication type", the node is set to non-display.

Figure 16:
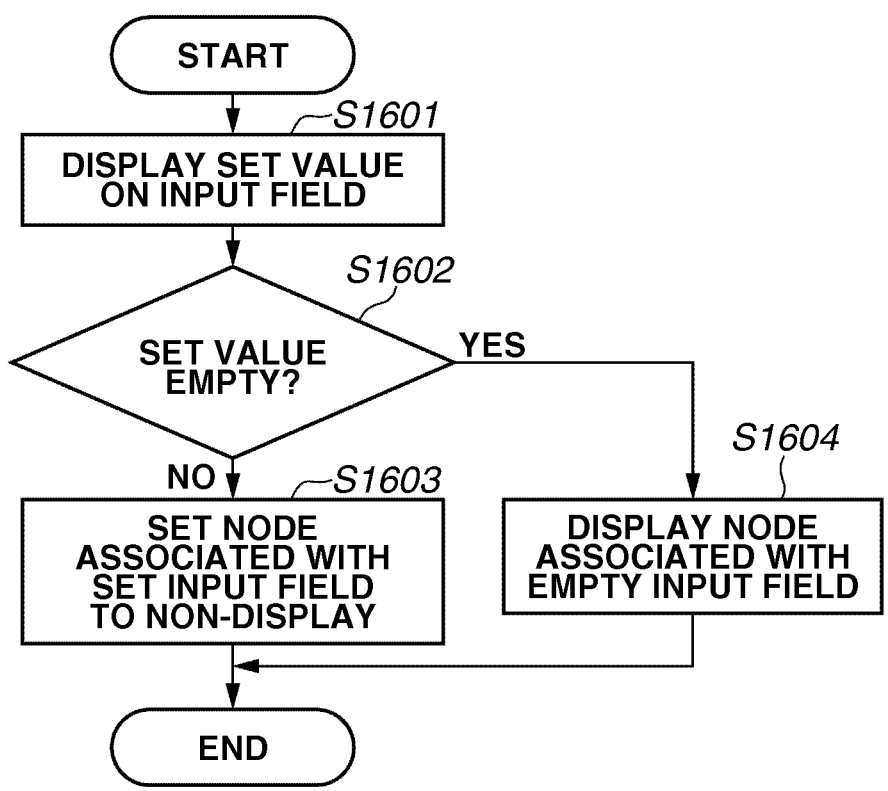
FIG. 16 is a flowchart of the processing flow creation application 450 from when setting to an input field is accepted, according to the third embodiment.

FIG. 16 is a flowchart of the processing flow creation application 450 from when a setting into an input field is accepted, according to the third embodiment.

In step S1601, the UI unit 454 displays the set value on the input field.

In step S1602, the UI unit 454 determines whether a value set in the input field is empty. If the value is not empty (NO in step S1602), the UI unit 454 advances the processing to step 1603. If the value is empty (YES in step S1602), the UI unit 454 advances the processing to step S1604. In step S1603, the UI unit 454 identifies using the UI control management table in FIG. 11 a node associated with the input field into which an input has been accepted, and sets the node to a non-display state.

In step S1604, the UI unit 454 specifies, by using the UI control management table in FIG. 11, a node associated with the input field into which an input has been accepted, and displays the node.

FIG. 17 illustrates an UI after "Taro" is input into an input field 1701, in the state of the UI in FIG. 15. "Taro" is displayed in the input field 1701. Since the value is set in the input field 1701, a node 1702 is set to non-display.

In the present embodiment, although the nodes relating to the set parameters are set to non-display, it is only necessary for the UI with which whether settings for the parameters are performed can be recognized. For example, backgrounds of the nodes for the parameters that are not set may be colored as illustrated in FIG. 18.

An input field 1801 is empty. Since a node 1802 is associated with the input field 1801 and setting is not performed, background of the node is colored. Further, though not illustrated, for example, typefaces of characters of only the nodes for the unset parameters, may be changed to boldfaces or italic faces.

In the present embodiment, determination is made depending on whether setting is performed for a parameter. Furthermore, whether setting is essential for a parameter may also be used for determination. For example, the background color of a node of a parameter to which setting is essential and setting is not performed is changed. Whether setting is essential is determined as defined in the task definition as described in FIG. 5B.

As described above, by changing the display of a node in the tree view and an input field arranged on the tab control in synchronization with each other, depending on whether the setting is present, the user can easily find an item that the user wants to set or an item that must be set.

Further, the present invention can be also realized by executing the processing of supplying software (program) that implements the functions of the above-described embodiments to a system or an apparatus via a network or various types of storage media, and causing a computer (or a CPU or a micro-processing unit (MPU)) of the system or the apparatus to read and execute the program.

According to the above-described embodiments, it is possible to prevent the user from losing sight of the parameter that the user is currently setting.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to embodiments, it is to be understood that the invention is not limited to the disclosed embodiments.

This application claims priority from Japanese Patent Application No. 2011-124591 filed Jun. 2, 2011, which is hereby incorporated by reference herein in its entirety.

What is claimed is:

1. An information processing apparatus comprising:
a display unit configured to display a user interface including:
a structure display area where a data structure is displayed as respective nodes in a tree-like form, and
a detailed setting display area where settings represented at nodes in the same hierarchy displayed in the structure display area are displayed for each tab, and fields for setting items are displayed in respective tabs; and
a management unit configured to manage the respective nodes and the respective tabs in association with each other, wherein, when detecting that a node in the structure display area is selected by a user's operation, the display unit identifies a tab associated with the selected node via the management unit and displays the identified tab in the detailed setting display area, and wherein, when detecting that a tab in the detailed setting display area is selected by a user's operation, the display unit identifies a node associated with the selected tab via the management unit and displays the identified node in the structure display area in a selected state.

2. The information processing apparatus according to claim 1, wherein the management unit is arranged to further manage the respective nodes, and fields displayed in the tabs in association with each other, and wherein, when detecting that a node in the structure display area is selected by the user's operation, the display unit further identifies a field associated with the selected node via the management unit and moves a cursor to the identified field in the detailed setting display area to display the cursor, and wherein, when detecting that a field in the detailed setting display area is selected by a user's operation, the display unit identifies a node associated with the selected field via the management unit and displays the identified node in a selected state in the structure display area.

3. The information processing apparatus according to claim 2, wherein the display unit is arranged to cause the display of a node to be varied between a case where a non-empty value is set in the selected field and a case where a non-empty value is not set.

4. The information processing apparatus according to claim 3, wherein the display unit is arranged to display a node in a case where a non-empty value is set in the selected field, and not to display a node in a case where a non-empty value is not set in the selected field.

5. The information processing apparatus according to claim 3, wherein the display unit is arranged to cause a typeface of characters displayed in a node to be varied between a case where a non-empty value is set in the selected field and a case where a non-empty value is not set therein.

6. The information processing apparatus according to claim 3, wherein the display unit is arranged to cause a background color of a node to be varied between a case where a non-empty value is set in the selected field and a case where a non-empty value is not set therein.

7. A display control method executed by an information processing apparatus, the display control method comprising:

displaying a user interface having a structure display area where a structure of data is displayed as respective nodes in a tree-like form, and a detailed setting display area where settings represented at nodes in a same hierarchy displayed in the structure display area are displayed for each tab, and fields for setting items are displayed in respective tabs;

managing each of the nodes and the corresponding one of the tabs in association with each other;

performing a first display control, when detecting that a node in the structure display area is selected by a user's operation, for specifying a tab of setting associated with the selected node, and displaying the specified tab in the detailed setting display area; and performing a second display control, when detecting that a tab in the detailed setting display area is selected by a user's operation, for specifying a node associated with the selected tab and displaying the specified node in the structure display area in a selected state.

8. A non-transitory computer-readable storage medium storing a program which, when executed by an information processing apparatus, causes the information processing apparatus to perform a display control method according to claim 7.

* * * * *